United States Patent [19]

Crabtree

[11] Patent Number: 4,968,651

[45] Date of Patent: Nov. 6, 1990

[54] INERT CERAMIC CATALYST BED SUPPORTS

[75] Inventor: Robert Crabtree, Hixson, Tenn.

[73] Assignee: Norton Company, Worcester, Mass.

[21] Appl. No.: 378,891

[22] Filed: Jul. 12, 1989

[51] Int. Cl.$^5$ .............................................. B01J 21/16
[52] U.S. Cl. ....................................... 502/63; 502/80; 502/439; 422/216; 422/311
[58] Field of Search .................... 502/8, 9, 63, 80, 407, 502/439; 422/179–181, 311, 216, 222

[56] References Cited

U.S. PATENT DOCUMENTS

| | | | |
|---|---|---|---|
| 266,477 | 10/1882 | Hurlbutt et al. | 502/63 |
| 329,070 | 10/1885 | Osborne | 502/63 |
| 2,080,359 | 5/1937 | Lepsoe et al. | 502/63 |
| 2,899,286 | 8/1959 | Miller | 23/288 |
| 3,271,323 | 9/1966 | Whittenmore, Jr. | 502/80 |
| 3,902,856 | 9/1975 | Burroughs et al. | 23/288 R |
| 4,229,418 | 10/1980 | Wijffels et al. | 422/191 |
| 4,590,045 | 5/1986 | van der Wal et al. | 422/216 |

FOREIGN PATENT DOCUMENTS

| | | |
|---|---|---|
| 74713 | 7/1978 | Japan. |
| 285905 | 11/1970 | U.S.S.R. |
| 498028 | 1/1976 | U.S.S.R. |

OTHER PUBLICATIONS

Barton et al., 1987 Spring Meeting of the American Ceramic Society-SE Section, "Feldspar or Feldspathic Sand-You Make the Choice", Apr. 2-3, 1987.

*Primary Examiner*—Carl F. Dees
*Attorney, Agent, or Firm*—David Bennett

[57] ABSTRACT

Catalyst bed supports having improved performance characteristics are prepared from a mixture of a clay and a feldspathic sand.

18 Claims, No Drawings

INERT CERAMIC CATALYST BED SUPPORTS

TECHNICAL FIELD

This invention relates to novel inert ceramic catalyst bed supports which are prepared from a mixture of a clay and a feldspathic sand.

BACKGROUND AND INFORMATION DISCLOSURE STATEMENT

The following publications are representative of the most relevant prior art known to applicant as of the time of the filing of this application:

| U.S. Pat. | | |
|---|---|---|
| 2,899,286 | August 11, 1959 | Miller |
| 3,902,856 | September 2, 1975 | Burroughs et al. |
| 4,229,418 | October 21, 1980 | Wijffels et al. |
| 4,590,045 | May 20, 1986 | van der Wal et al. |

Other Reference

Barton et al., 1987 Spring Meeting of the American Ceramic Society SE - Section, "Feldspar or Feldspathic Sand - You Make the Choice", Apr. 2-3, 1987.

Catalyst bed supports have been used for years with particulate catalysts or absorbent beds in chemical reactors. They serve both to support and to protect catalyst and absorbent beds from gas flows at various pressures, temperatures and rates. As such, they must have a high impact resistance so that they do not break on handling during loading into a reactor and also must have the ability to withstand rapid changes in pressure.

Generally the art has paid scant attention to catalyst bed supports on the premise that they were just a necessary evil. As such the art contains little in the way of detailed suggestions as to suitable compositions to be used to form catalyst bed supports. For example, U.S. Pat. No. 2,899,286 discloses the use of simply a shallow layer of suitably sized "refractory balls" followed by a second shallow layer of smaller refractory balls. There is no further teaching of about the support balls in the reference.

U.S. Pat. No. 3,902,856 discloses the use of mullite balls or slag to act as a filter and retain the catalyst in the reactor. The filter is later described as ceramic balls but with no specific teaching of composition.

U.S. Pat. No. 4,229,418 discloses the use of spherical bodies of ceramic material having sizes of 24, 12 and 5 mm. Again there is no further teaching of composition of the spherical bodies.

U.S. Pat. No. 4,590,045 teaches that any suitable material having a high breaking strength and being not adversely reactive with the fluid in the reactor may be used as catalyst bed supports. It goes on to suggest the use of ceramics or inert metals, or even the carrier material of the catalyst particles in the reactor. It further suggests the use of catalyst material per se.

Norton Company, the assignee of this application, currently sells catalyst bed supports. One of these products is Denstone 100 which is composed of a mixture of clay and mullite in a weight ratio of 90:10. Another is Denstone 57 which contains clay and soda feldspar (which contains no less than 7% sodium oxide) in a 95:5 weight ratio.

Feldspathic sand is disclosed in the Barton et al. article to represent an improvement over a combination of feldspar and flint in the formation of sanitaryware bodies. There is no suggestion of in Barton et al. of using the feldspathic sand in any other applications, let alone in catalyst bed supports.

None of the prior art suggests the preparation of catalyst bed supports from a mixture of a clay and a feldspathic sand, nor that such a combination of materials would produce effective bed supports.

SUMMARY OF THE INVENTION

This invention provides inert ceramic catalyst bed supports which comprise formed bodies of a mixture of about 10 to about 90 weight percent clay and about 90 to about 10 weight percent feldspathic clay. The supports are generally in the shape of spheres. The invention further provides a method of preparing such supports.

DESCRIPTION OF THE PREFERRED EMBODIMENTS

The present invention entails forming catalyst bed supports from a mixture of a clay and a feldspathic sand. It is to be noted that normally a catalyst bed support is not used as a catalyst carrier/support. This is so because carrier/supports which need to have sufficient porosity to carry catalytic metals would often have too low an abrasion resistance to be effective catalyst bed supports, and also are not sufficiently catalytically inert. The catalyst bed supports of the present invention comprise about 10 to about 90 weight percent of a clay and correspondingly about 90 to about 10 weight percent of a feldspathic sand. Preferably, they are comprised of about 50 to about 80 weight percent clay and about 50 to about 20 weight percent feldspathic sand. Most preferably, they are comprised of about 55 to about 75 weight percent clay and about 25 to about 45 weight percent feldspathic clay.

The clay component of the catalyst bed supports may be any type of clay which is conventionally utilized in the manufacture of catalyst supports. Examples of suitable clays include: American, ball, bone, china, fire, pipe, and potters' clays. Preferably the clay is a fire clay because they are generally coarser than other clays and thus have enhanced drying characteristics. Most preferably the fire clay is an Ohio or Pennsylvania fire clay.

The feldspathic sand component of the present invention is an oxide combination of predominantly silicon, aluminum, potassium, and sodium, optionally together with minor amounts of other oxides such as ferric oxide, titania, magnesia, calcium oxide, and lithium oxide. Generally such a material will comprise about 75 to about 85 percent silica, about 5 to about 15 percent alumina, about 1 to about 5 percent potash ($K_2O$), about 2 to about 8 percent soda ($Na_2O$), and up to about 5 percent other oxides. A particularly preferred feldspathic sand is one which is commercially available under the tradename "Lithospar" from Spartan Minerals, a subsidiary of Lithium Corporation of America. "Lithospar" feldspathic sand is produced as a by-product from lithium pegmatite (which consists of the minerals spodumene, muscovite mica, feldspar, and silica) by crushing the ore, milling it in a water washed ball mill to approximately 65 U.S. mesh, and passing the milled material through a series of conditioning tanks and flotation cells in which the minerals are selectively separated. The first material separated is the spodumene followed by the mica, iron-bearing minerals, and finally the feldspathic sand is all that remains. The feldspathic sand is then dried and ground to size. Accordingly, the specific composition of the "Lithospar" feldspathic sand will vary depending upon the composition of the initial ore and the completeness of the purification steps. A representative analysis for "Lithospar" feldspathic sand is as follows:

| Oxide | Weight % |
|---|---|
| Silicon | 81.50 |
| Aluminum | 10.85 |
| Sodium | 4.65 |
| Potassium | 2.50 |
| Calcium | 0.20 |
| Lithium | 0.11 |
| Ferric | 0.06 |
| Titanium | trace |
| Magnesium | trace |

Accordingly, a feldspathic sand useful herein will preferably contain about 78 to about 84% silica, about 9 to about 13% alumina, about 3 to about 6.5% soda about 1.5 to about 4% potash, and up to about 1% other material.

The catalyst bed supports are conveniently prepared by combining the clay and the feldspathic sand, preferably with a liquid such as water, to produce a formable composition, forming the composition into the desired shape supports, drying the formed supports, and then firing them at elevated temperature for an extended period of time to vitrify them and to maximize their impact resistance.

Generally the formable composition will be prepared by first dry mixing the clay (which will normally contain about 2 to about 5% water, which should be taken into account in determining the amount of liquid, if any, added to form the catalyst bed supports) and the feldspathic sand and then optionally adding about 8 to about 45 percent liquid, i.e. water, with continued mixing until a uniform composition results. The clay and feldspathic sand will generally be in the form of about +20 to about +50 U.S. mesh particles, though this is not considered critical. The formable mixture is then basicly formed into the desired shapes, commonly spherical or cylindrical, by any suitable operation such as pressing, casting, extrusion, and pan granulation. Thereafter various rounding operations may be performed, if desired. The amount of liquid added will vary depending upon the formation method being used. For instance, to form an extrudable mix the total water content is preferably about 12 to about 16 weight percent; to form a castable mix the total water content is preferably about 20 to about 30 weight percent; in pan granulation the total water content is preferably about 12 to about 18 weight percent. Preferred catalyst bed supports of the present invention are essentially spherical in shape, generally having average diameters on the order of about ⅛ to about 2 inch, preferably about ¼ to about 1 inch. Preferably the forming will be performed by a conventional extrusion technique. Then the liquid, if utilized to assist in the forming, is removed by a standard drying operation at temperatures up to about 200° F. A particularly suitable drying operation is conducted with a belt drier. The dried catalyst bed supports are finally fired to vitrify the supports. This may be performed in any suitable manner, though preferably a tunnel kiln will be used. The firing is continued until vitrification has occurred. This may be determined by taking pyrometric cone readings in the kiln and ceasing firing when readings of about 8-6 to about 9-3 are obtained. Generally the maximum temperature will be at least about 2100° F., preferably at least about 2150° F., and most preferably at least about 2200° F. Normally the total firing time will be for an extended period, i.e. at least about 10 hours, preferably at least about 20 hours, and most preferably at least about 30 hours.

The catalyst bed supports may be used as simply a direct replacement for conventional bed supports. Accordingly, further details on their use is readily available from the literature and is not repeated here.

The following non-limiting specific examples are provided to demonstrate the preparation and evaluation of catalyst bed supports in accordance with the principles of this invention. All parts and percents are by weight unless otherwise specified.

EXAMPLE I

One-half inch spherical catalyst bed supports consisting of 70 percent fire clay and 30 percent feldspathic sand are prepared by mixing 1050 pounds of an Ohio fire clay with 450 pounds of +20 U.S. mesh feldspathic sand (Lithospar from Spartan Minerals Corp.). The particulates are dry mixed to form a uniform mixture. Thereafter, about 150 pounds of water is added to form an extrudable mix. The mix is extruded through a conventional commercial extruder and formed into essentially spherical balls by means of a rotating drum. The spherical supports are then dried on a belt drier at a maximum temperature of about 185° F. Finally, the dried supports are fired in a conventional oven for 33.3 hours to a peak temperature of 2210° F. (1210° C.).

EXAMPLE II

To evaluate the physical properties of the catalyst bed supports of Example I in comparison with a commercial support (Denstone 57 of Norton Company which is prepared from a blend of 95 parts fire clay and 5 parts soda feldspar). The supports are each formed as ½ inch balls. The two supports are evaluated for water absorption, crush strength, drop test survival, thermal shock drop test survival, and decompression test survival. The drop test survival is determined by free dropping (i.e. not through a tube) 100 balls from a height of 25 feet onto a ¼ inch steel plate and determining the percent survival. The thermal shock drop test is performed by heating 30 balls for one hour at 800° F., immediately dropping them into a bucket of room temperature water, then dropping the surviving quenched balls down a 25' pipe onto a ¼ inch steel plate, and determining the percent survival. The decompression test is performed in an autoclave at 800° F. in a hydrogen atmosphere and 1500 psi by allowing the conditions to stabilize, then releasing the pressure over a period of five seconds, and determining the percent survival. The results are as follows:

| Test | Invention | Comparison |
|---|---|---|
| Water Absorption, % | 0.2–1.2 | 0.1–0.3 |
| Ave. Flat Plate Crush Strength, lbs. | 700–900 | 400–580 |
| Drop Test Survival Rate, % | 95–100 | 48 |
| Thermal Shock-Drop Test Survival Rate, % | 90–100 | — |
| Decompression Test Survival Rate, % | 99 | — |

The catalyst bed supports of the present invention are superior to the current commercial product in that they will withstand more severe handling and operating conditions while exhibiting only a very slight increase in water absorptivity.

EXAMPLE III

The procedures of Examples I and II are repeated to produce spherical catalyst bed supports having average diameters of about ¾ inch. Two different formulations are prepared in accordance with the present invention—the first consisting of 70% fire clay and 30% feldspathic sand, while the second is 60% fire clay and 40% feldspathic sand. For comparison purposes, ¾ balls of Denstone 57 (95% fire clay/5% soda feldspar) and Denstone 100 (90% fire clay/10% mullite) are also prepared.

The four support samples are evaluated in a similar manner to Example II and the results of the water absorption and crush strength (average) tests are as follows:

| Test | 70/30 | 60/40 | D-57 | D-100 |
| --- | --- | --- | --- | --- |
| Water absorption, wt. % | 1.65 | 1.58 | <0.4 | 1-3 |
| Crush Strength, lbs. | 1383 | 1440 | 950 | 950 |

Thus, the compositions of the present invention absorb similar amounts of water as the commercial products while possessing substantially greater crush strengths.

In addition, the samples are subjected to various drop tests to determine their likelihood of damage during loading into a reactor. The two compositions of this invention are dropped free-fall from a height of 25'. The 70/30 composition has an 86% survival and the 60/40 has a 96% survival. The Denstone 57 when dropped from a height of only 15' has only a 70% survival. The Denstone 100 when dropped through a 1.25" inside diameter tube from a height of 25' has only a 70% survival. It must be noted that dropping through a tube is a much less severe test than free-fall since the catalyst bed support balls are likely to hit the sides of the tube during falling and thereby reduce their momentum. The two composition of this invention are also subjected to the Decompression Test of Example II. The 70/30 composition exhibits 98.7% survival while the 60/40 composition exhibits 92.3% survival.

EXAMPLE IV

Additional samples of catalyst bed supports of this invention are prepared from 70% fire clay and 30% feldspathic sand, formed into ½" balls, and fired as in Example I. These samples are subjected to an even more severe thermal shock drop test than described in Example II. The more difficult test is performed by increasing the temperature to which the support balls are heated prior to being dropped into room temperature water. When the temperature is 1200° F., 90% of the balls survived; when the temperature is increased to 1300° F. for a new set of 100 support balls, 80% of the balls survived; and when a third set of support balls is heated to 1430° F., only 68% of them survive the second dropping. Clearly, the catalyst bed supports of the present invention are superior to the commercial products.

EXAMPLE V

The procedure of Example I is repeated to produce catalyst bed supports from 65% pipe clay and 35% feldspathic sand. The resultant balls are evaluated as in Example II and exhibit similar properties.

EXAMPLE VI

The procedure of Example I is repeated to produce catalyst bed supports from 55% fire clay and 45% of a feldspathic sand consisting of 79.1% silica, 11.8% alumina, 4.3% soda, 3.7% potash, and 1.1% other oxides. The particles are dry blended and pressed into cylinders having a diameter of ¾" and a length of 1". The cylinders are fired for 25 hours at a maximum temperature of 2175° F. until vitrification occurs. The cylinders exhibit similar properties to the balls of Example II.

What is claimed is:

1. An inert ceramic catalyst bed support which comprises a formed body of a mixture of about 10 to about 90 weight percent clay and about 90 to about 10 weight percent feldspathic clay.

2. The catalyst bed supports of claim 1 wherein the clay is present in an amount of about 50 to about 80 weight percent and the feldspathic sand is present in an amount of about 50 to about 20 weight percent.

3. The catalyst bed supports of claim 1 wherein the clay is selected from the group consisting essentially of American, ball, bone, china, fire, pipe, and potters' clays.

4. The catalyst bed supports of claim 1 wherein the clay is a fire clay.

5. The catalyst bed supports of claim 1 wherein the feldspathic sand comprises about 75 to about 85 percent silica, about 5 to about 15 percent alumina, about 1 to about 5 percent potassium oxide, about 2 to about 8 percent sodium oxide, and up to about 5 percent other oxides.

6. The catalyst bed supports of claim 5 wherein the feldspathic sand comprises about 78 to about 84% silica, about 9 to about 13% alumina, about 3 to about 6.5% soda, about 1.5 to about 4% potash, and up to about 1% other.

7. The catalyst bed supports of claim 1 which are prepared from clay and feldspathic sand particles which are −20 and +50 U.S. mesh.

8. The catalyst bed supports of claim 1 in the shape of essentially spherical balls.

9. A method of preparing a catalyst bed support which comprises (i) blending particles of about 10 to 90 weight percent clay and about 90 to about 10 weight percent feldspathic sand, (ii) forming the blended particles into specific shapes, and (iii) firing the shapes until vitrification occurs.

10. The method of claim 9 wherein the forming is performed by adding a liquid to the particles to produce an extrudable composition and then extruding the composition.

11. The method of claim 10 wherein after the extrusion the extruded shapes are rolled to form essentially spherical balls.

12. The method of claim 9 wherein the firing is performed at a maximum temperature of at least about 2100° F.

13. The method of claim 9 wherein the clay is selected from the group consisting essentially of American, ball, bone, china, fire, pipe, and potters' clays.

14. The method of claim 9 wherein the clay is a fire clay.

15. The method of claim 9 wherein the feldspathic sand comprises about 75 to about 85 percent silica, about 5 to about 15 percent alumina, about 1 to about 5 percent potassium oxide, about 2 to about 8 percent sodium oxide, and up to about 5 percent other oxides.

16. The method of claim 15 wherein the feldspathic sand comprises about 78 to about 84% silica, about 9 to about 13% alumina, about 3 to about 6.5% sodium oxide, about 1.5 to about 4% potassium oxide, and up to about 1% other oxides.

17. The method of claim 9 which are prepared from clay and feldspathic sand particles which are −20 and +50 U.S. mesh.

18. The method of claim 9 wherein the firing is performed at a maximum temperature of at least about 2150° F.

* * * * *